United States Patent [19]

Angeloff

[11] Patent Number: 4,571,155
[45] Date of Patent: Feb. 18, 1986

[54] WIND TURBINE YAW STABILIZER
[75] Inventor: Lloyd G. Angeloff, North Merrick, N.Y.
[73] Assignee: Grumman Aerospace Corporation, Bethpage, N.Y.
[21] Appl. No.: 595,973
[22] Filed: Apr. 2, 1984
[51] Int. Cl.[4] .............................................. F03D 7/04
[52] U.S. Cl. ......................................... 416/13; 416/11
[58] Field of Search ...................... 416/9-15, 416/17; 73/188, 189

[56] References Cited

U.S. PATENT DOCUMENTS

| | | |
|---|---|---|
| 262,000 | 8/1882 | Chamberlain . |
| 264,862 | 9/1882 | Coffield . |
| 264,930 | 9/1882 | Conradson . |
| 275,140 | 4/1883 | Carman . |
| 293,836 | 2/1884 | Winger . |
| 295,084 | 3/1884 | Underwood . |
| 349,197 | 9/1886 | Albee . |
| 390,698 | 10/1888 | Nichols . |
| 2,352,089 | 6/1944 | Fagerlund ......................... 416/9 X |
| 2,603,300 | 7/1952 | King .................................. 416/9 X |
| 3,803,910 | 4/1974 | Crompton ........................... 73/188 |
| 4,075,500 | 2/1978 | Oman et al. ....................... 415/2 X |
| 4,474,531 | 10/1984 | Weiss .................................. 416/11 |

FOREIGN PATENT DOCUMENTS

| | | | |
|---|---|---|---|
| 3008379 | 9/1981 | Fed. Rep. of Germany ........ | 416/11 |
| 293 | of 1870 | United Kingdom .................. | 73/188 |

Primary Examiner—Everette A. Powell, Jr.
Attorney, Agent, or Firm—Richard G. Geib; Daniel Jay Tick; Bernard S. Hoffman

[57] ABSTRACT

A vane pivotally mounted atop a wind turbine, rotatably mounted on a support structure, rotates freely with the wind. A cam is affixed to and rotatable with the vane. A toothed wheel is stationarily affixed to the support structure. A pair of pawls are mounted atop the wind turbine in operative proximity with the cam and the toothed wheel. Thus, when the vane rotates to align itself with a new wind vector, the cam rotates with the vane and disengages one of the pawls from the toothed wheel thereby permitting the wind turbine to rotate in the direction of rotation of the vane until the wind turbine is aligned with the vane at which point both the pawls engage the toothed wheel, locking the wind turbine in aligned position with the wind.

9 Claims, 4 Drawing Figures

WIND TURBINE YAW STABILIZER

BACKGROUND OF THE INVENTION

The present invention relates to a wind turbine yaw stabilizer.

Free-yawing wind turbines align with the wind aerodynamically. This is accomplished by either a tail vane, if the rotor is upwind of the tower, or an equalizing drag on the rotor if it is downwind of the tower. A characteristic of free-yawing wind turbines is that the turbine may oscillate several times about its vertical pivot axis when the wind direction changes before pointing into the wind again. Furthermore, turbulence or vertical wind shear may cause the turbine to be positioned off-line relative to the wind vector and remain thus misaligned for a period of time.

An adverse effect of the aforedescribed misalignment is a reduction in the efficiency of the rotor. Another adverse effect of the misalignment is an increase in aerodynamic loading of the rotor due to off-axis winds. Still another adverse effect is the inducing of gyroscopic loads in the rotor and drive train when the machine changes direction about its pivot axis.

U.S. Pat. No. 262,000, Chamberlain; U.S. Pat. No. 264,862, Coffield; U.S. Pat. No. 264,930, Conradson; U.S. Pat. No. 275,140, Carman; U.S. Pat. No. 293,836, Winger; U.S. Pat. No. 295,084, Underwood; U.S. Pat. No. 349,197, Albee; U.S. Pat. No. 390,698, Nichols; and U.S. Pat. No. 4,075,500, Oman et al disclose wind turbines or machines with the rotor, or "windwheel" geared to a torque shaft running down the tower to machinery on the ground; that is "power machines" as contrasted to "pumping machines." The problem dealt with is that of the torque reaction tending to turn the wind turbine partialy out of the wind, resulting in reduced efficiency, or in extreme instances, ninety degrees to the wind, ending up with shutdown. The problem seemed to be aggravated in downwind, tail-less machines, all of these patents could apply to either downwind or upwind turbines or machines.

In all these patents, except Conradson, the treatment consists in ratcheting the wind machine on the tower so as to be free to yaw in the direction opposite to that induced by the torque reaction, but locked against that tendency until there is an actual wind shift in that direction, at which time a vane activated by the new wind direction lifts the ratchet pawl and allows the turbine to assume the new, proper alignment.

Chamberlain, U.S. Pat. No. 262,000, discloses the mounting of a wind machine or turbine on a tower with a ratchet arrangement, so that it is restrained against torque reaction, but free to yaw in the other direction. A wind change in the direction of the torque reaction activates a vane, causing a pawl to lift until the machine attains alignment with the new wind direction.

Coffield, U.S. Pat. No. 264,862, discloses a device which functions on a similar principle to Chamberlain. Coffield differs in that, instead of lifting the pawl, the vane releases a brake bearing on a wheel containing the ratchet.

Conradson, U.S. Pat. No. 264,930, discloses an interrupted, active, positive drive to maintain alignment with the wind. A takeoff from the rotor shaft is directed by a vane to engage the inner or outer row of teeth on a tower-mounted bull gear to yaw the machine in either direction as required. When no motion is required, the continuously turning gear powered from the rotor shaft hovers between the two rows of gear teeth. Conradson does not mention vane damping or the amount of deadband. The sound of a spur gear, turning at rotor speed, constantly engaging, disengaging and re-engaging would really be interesting to hear. However, it would only last for a little while.

The wind machine of Conradson is locked against torque reaction by two sets of three miter gears. Within the machine, one miter gear drives an upper and lower similar gear on vertical counter rotating shafts. These shafts, in turn, drive a tower-mounted counter shaft. The machine is thus locked against the torque reaction and cannot, in fact, move in yaw until driven by the mechanism, or aerodynamic loads, at which time a ratchet in either the upper or lower machine mounted miter gear, depending on the yaw direction required, is overridden.

Carman, U.S. Pat. No. 275,140 discloses a device which is essentially that of Chamberlain, differing only in minute detail.

Winger, U.S. Pat. No. 293,836, discloses the ratcheting of a miter gear-holding member to the tower. The independently mounted rotor is coupled through a flexible coupling or a chain drive. The rotor portion is free to track the wind within a set yaw range. Wind direction changes approaching the limits will either nudge the gear-bearing part and override the ratchet if in one direction, or lift the pawl for the other. Since the range limits are set by the capabilities of the coupling or chain arrangement, the plus or minus 45° seems unrealistic.

Underwood, U.S. Pat. No. 295,084, discloses another variation on the theme of a vane controlled ratchet pawl release. Underwood adds a ground accessible hand release which is coupled with a manual feather.

Albee, U.S. Pat. No. 349,197, discloses a ratchet and pawl release and adds a ground accessible pawl release incorporated with a manual feather.

Nichols, U.S. Pat. No. 390,698, discloses essentially the same device as Chamberlain, Carman and Albee, except that the ratchet plate is spring-mounted.

Oman et al discloses a rotatable duct having an outlet to inlet area ratio greater than one. A wind-rotatable turbine is mounted within the duct. A generator driven by the turbine is a synchronous generator loading the drive from the turbine. A stator varies the incidence of wind for rotating the turbine. The stator includes a fixed leading portion and a trailing edge flap movable relative to the fixed leading portion. The trailing edge flap is movable by means sensitive to wind velocity to vary the swirl imparted to flow thereby providing a good working load distribution to all radial, span, stations of the turbine in optimizing disk loading for the turbine and the duct thereabout, so that with the load on the drive by the generator, constant turbine speed control can be effectuated over a wide range of wind velocities.

The principal object of the invention is to provide a wind turbine yaw stabilizer which eliminates the adverse effects caused by misalignment of the wind turbine.

An object of the invention is to provide a wind turbine yaw stabilizer which eliminates misalignment of the wind turbine.

Still another object of the invention is to provide a wind turbine yaw stabilizer which maintains the wind turbine in alignment with the wind vector.

Yet another object of the invention is to provide a wind turbine yaw stabilizer which eliminates horizontal oscillations of the turbine.

Another object of the invention is to provide a wind turbine yaw stabilizer which reduces yaw excursions and yaw rates of the wind turbine.

Still another object of the invention is to provide a wind turbine yaw stabilizer which prevents a reduction in the efficiency of the rotor, prevents an increase in aerodynamic loading of the rotor due to off-axis winds and prevents inducing of gyroscopic loads in the rotor and drive train.

BRIEF SUMMARY OF THE INVENTION

In accordance with the invention, a yaw stabilizer device for an equipment unit rotatably mounted on a support structure comprises a vane pivotally mounted atop the equipment unit for free rotation with the wind. A cam is affixed to and rotatable with the vane. A toothed wheel is stationarily affixed to the support structure. A pawl device is mounted atop the equipment unit in operative proximity with the cam and the toothed wheel. The pawl device comprises first and second pawls mounted atop the equipment unit on substantially diametrically opposite sides of the cam. The pawls extend symmetrically to a substantially vertical plane through the axis of the cam whereby when the first of the pawls engages the toothed wheel it prevents rotation of the equipment unit in a clockwise direction and permits rotation of the equipment unit in a counterclockwise direction and when the second of the pawls engages the toothed wheel it prevents rotation of the equipment unit in a counterclockwise direction and permits rotation of the equipment unit in a clockwise direction. When the vane rotates to align itself with a new wind vector, the cam rotates with the vane and disengages one of the pawls from the toothed wheel thereby permitting the equipment unit to rotate in the direction of rotation of the vane until the equipment unit is aligned with the vane at which point the cam permits both the pawls to engage the toothed wheel, locking the equipment unit in aligned position with the wind.

The equipment unit, the vane and the cam are mounted to rotate in substantially horizontal planes and the toothed wheel is positioned in a substantially horizontal plane.

The equipment unit, the vane, the cam and the toothed wheel are coaxially mounted.

The equipment unit comprises a wind turbine, and the equipment unit, the vane and the cam are coaxially mounted to rotate in substantially horizontal planes and the toothed wheel is positioned in a substantially horizontal plane and mounted coaxially with the equipment unit, the vane and the cam.

The cam comprises a substantially disc configuration defined by a substantially open circle closed by a chord of the circle, and the pawl device comprises first and second pawls mounted atop the equipment unit on substantially diametrically opposite sides of the cam, the pawls extending symmetrically to a substantially vertical plane through the axis of the cam whereby when the pawls engage the toothed wheel the first of the pawls prevents rotation of the equipment unit in a clockwise direction and permits rotation of the equipment unit in a counterclockwise direction and the second of the pawls prevents rotation of the equipment unit in a counterclockwise direction and permits rotation of the equipment unit in a clockwise direction.

In accordance with the invention, a wind turbine yaw stabilizer device for a wind turbine rotatably mounted on a support structure comprises a vane pivotally mounted atop the wind turbine for free rotation with the wind. A cam is affixed to and rotatable with the vane. A toothed wheel is stationarily affixed to the support structure. A pair of pawls are mounted atop the wind turbine in operative proximity with the cam and the toothed wheel. The pair of pawls comprises first and second pawls mounted atop the wind turbine on substantially diametrically opposite sides of the cam. The pawls extend symmetrically to a substantially vertical plane through the axis of the cam whereby when the first of the pawls engages the toothed wheel it prevents rotation of the equipment unit in a clockwise direction and permits rotation of the equipment unit in a counterclockwise direction and when the second of the pawls engages the toothed wheel it prevents rotation of the equipment unit in a counterclockwise direction and permits rotation of the equipment unit in a clockwise direction. When the vane rotates to align itself with a new wind vector, the cam rotates with the vane and disengages one of the pawls from the toothed wheel thereby permitting the wind turbine to rotate in the direction of rotation of the vane until the wind turbine is aligned with the vane, at which point the cam permits both the pawls engage the toothed wheel, locking the wind turbine in aligned position with the wind.

The wind turbine, the vane and the cam are coaxially mounted to rotate in substantially horizontal planes and the toothed wheel is positioned in a substantially horizontal plane and mounted coaxially with the wind turbine, the vane and the cam. The cam comprises a substantially disc configuration defined by a substantially open circle closed by a chord of the circle.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

The wind turbine yaw stabilizer device of the invention is described for a wind turbine (FIGS. 1 to 4) rotatably mounted on a support structure 2 (FIGS. 2 and 3), although said device is usable with any suitable equipment unit such as, for example, a battery of lights, a battery of cameras, an antenna for transmitting and/or receiving signals in the atmosphere and/or in space, etc. Furthermore, the FIGS. illustrate the wind turbine yaw stabilizer as it is applied to downwind apparatus, although it may be applied to upwind apparatus.

Figure 1:
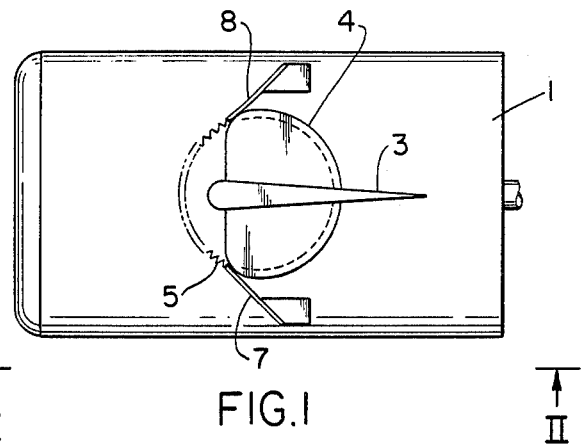
FIG. 1 is a top plan view of an embodiment of the yaw stabilizer device of the invention mounted on a wind turbine aligned with the wind.
Figure 3:
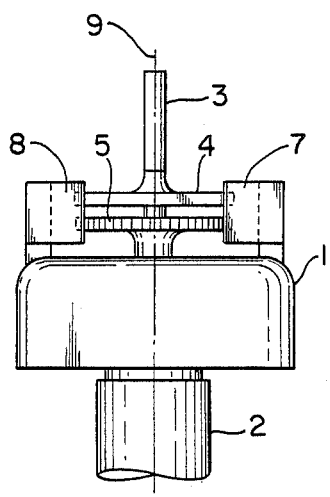
FIG. 3 is a rear view, taken along the lines III—III, of FIG. 2.
Figure 2:
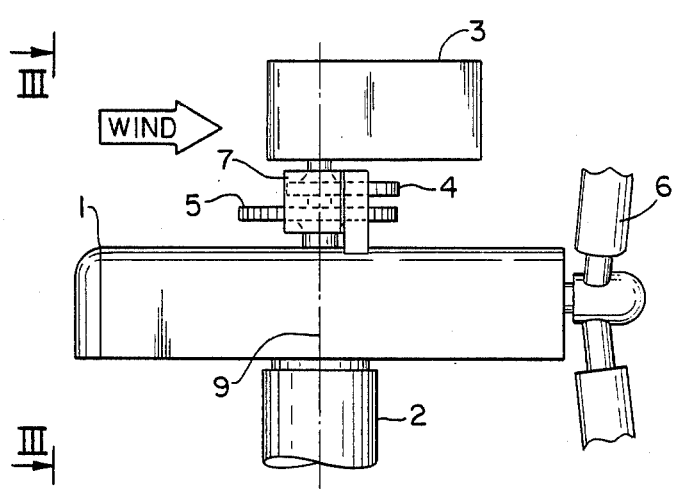
FIG. 2 is a side view, taken along the lines II—II, of FIG. 1.

As shown in FIGS. 1 to 4, a vane 3 is pivotally mounted atop the wind turbine 1 for free rotation with the wind. A cam 4 (FIGS. 1 to 4) is affixed to, and rotatable with, the vane 3 (FIGS. 2 and 3). The vane 3 and the cam 4 are mounted to rotate in substantially horizontal planes, as shown in the FIGS., and the cam comprises a substantially disc configuration defined by a substantially open circle closed by a chord of said circle.

A toothed wheel 5 (FIGS. 1 to 4) is positioned in a substantially horizontal plane and is stationarily affixed to the support structure 2, and the wind turbine or equipment unit 1, the vane 3, the cam 4 and said toothed wheel are coaxially mounted, as shown in the FIGS.

Figure 4:
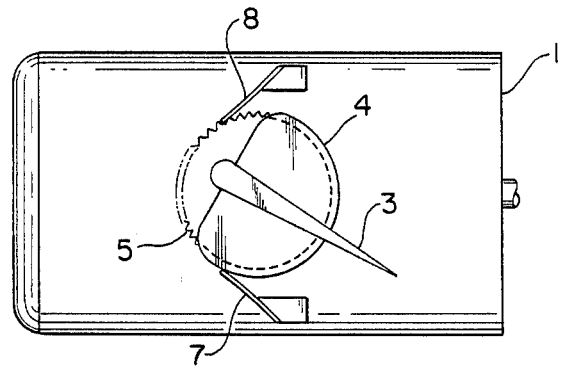
FIG. 4 is the view of FIG. 1 with the vane aligned with a new wind vector.

Although the wind turbine 1 has blades 6, shown in FIG. 2, such blades are not shown in FIGS. 1, 3 and 4 in order to maintain the clarity of illustration.

First and second pawls 7 and 8, respectively (FIGS. 1, 3 and 4) are mounted atop the wind turbine 1 in operative proximity with the cam 4 and the toothed wheel 5. The first and second pawls 7 and 8 are mounted on substantially diametrically opposite sides of the cam 4 and extend symmetrically to a substantially vertical plane through the axis 9 of the cam 4 (FIGS. 2 and 3) which is also the axis of rotation of the wind turbine 1 and the vane 3, as well as said cam.

When the first pawl 7 engages the toothed wheel 5, it prevents rotation of the wind turbine 1 in a clockwise direction and permits rotation of said wind turbine in a counterclockwise direction. When the second pawl 8 engages the toothed wheel 5, it prevents rotation of the wind turbine 1 in a counterclockwise direction and permits rotation of said wind turbine in a clockwise direction.

In FIGS. 1 to 3, the wind turbine 1 is aligned with the wind, which blows essentially from left to right in these figures. The pawls 7 and 8 are engaged with the toothed wheel 5, locking the wind turbine 1 in position.

When the vane 3 rotates to align itself with a new wind vector, as shown in FIG. 4, the cam 4 rotates with said vane and disengages the first pawl 7 from the toothed wheel 5. This permits the wind turbine 1 to rotate in a clockwise direction, which is the direction of rotation of the vane 3, until said wind turbine is aligned with said vane, at which point both pawls 7 and 8 engage the toothed wheel 5. When both pawls 7 and 8 engage the toothed wheel 5, they lock the wind turbine 1 in aligned position with the wind.

Although the wind turbine yaw stabilizer device of the invention is illustrated in a mechanical application, it may also be applied to any electromechanical, hydraulic, or other system in which the relative movement of the vane 3 with respect to the axis or center line of the wind turbine 1 serves to release said turbine from a locked position in yaw, so that it may realign with the wind vector.

Although shown and described in which are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. A yaw stabilizer device for an equipment unit rotatably mounted on a support structure, said yaw stabilizer device comprising;

a support structure;

an equipment unit rotatably mounted on said support structure;

a vane pivotally mounted atop said equipment unit for free rotation with the wind;

a cam affixed to and rotatable with said vane;

a toothed wheel stationarily affixed to said support structure; and pawl means mounted atop said equipment unit in operative proximity with said cam and said toothed wheel, said pawl means comprising first and second pawls mounted atop said equipment unit on substantially diametrically opposite sides of said cam, said pawls extending symmetrically to a substantially vertical plane through the axis of said cam whereby when said first of said pawls engages said toothed wheel it prevents rotation of said equipment unit in a clockwise direction and permits rotation of said equipment unit in a clockwise direction and permits rotation of said equipment unit in a counterclockwise direction and when said second of said pawls engages said toothed wheel it prevents rotation of said equipment unit in a counterclockwise direction and permits rotation of said equipment unit in a clockwise direction, whereby when said vane rotates to align itself with a new wind vector, said cam rotates with said vane and disengages one of said pawls from said toothed wheel thereby permitting said equipment unit to rotate in the direction of rotation of said vane until said equipment unit is aligned with said vane, at which point said cam permits both said pawls to engage said tooth wheel, locking said equipment unit in aligned position with said wind.

2. A yaw stabilizer device as claimed in claim 1, wherein said equipment unit, said vane and said cam are mounted to rotate in substantially horizontal planes and said toothed wheel is positioned in a substantially horizontal plane.

3. A yaw stabilizer device as claimed in claim 1, wherein said equipment unit, said vane, said cam and said toothed wheel are coaxially mounted.

4. A yaw stabilizer device as claimed in claim 1, wherein said equipment unit comprises a wind turbine.

5. A yaw stabilizer device as claimed in claim 4, wherein said equipment unit, said vane and said cam are coaxially mounted to rotate in substantially horizontal planes and said toothed wheel is positioned in a substantially horizontal plane and mounted coaxially with said equipment unit, said vane and said cam.

6. A yaw stabilizer device as claimed in claim 5, wherein said cam comprises a substantially disc configuration defined by a substantially open circle closed by a chord of said circle.

7. A yaw stabilizer device as claimed in claim 6, wherein said pawl means comprises first and second pawls mounted atop said equipment unit on substantially diametrically opposite sides of said cam, said pawls extending symmetrically to a substantially vertical plane through the axis of said cam whereby when said first of said pawls engages said toothed wheel it prevents rotation of said equipment unit in a clockwise direction and permits rotation of said equipment unit in a counterclockwise direction and when said second of said pawls engages said toothed wheel it prevents rotation of said equipment unit in a counterclockwise direction and permits rotation of said equipment unit in a clockwise direction.

8. A wind turbine yaw stabilizer device for a wind turbine rotatably mounted on a support structure, said yaw stabilizer device comprising a support structure;

a wind turbine rotatably mounted on the support structure;

a vane pivotally mounted atop said wind turbine for free rotation with the wind;

a cam affixed to and rotable with said vane;

a toothed wheel stationarily affixed to said support structure; and a pair of pawls mounted atop said wind turbine in operative proximity with said cam and said toothed wheel, said pair of pawls comprising first and second pawls mounted atop said wind turbine on substantially diametrically opposite sides of said cam, said pawls extending symmetrically to a substantially vertical plane through the axis of said cam whereby when said first of said pawls engages said toothed wheel it prevents rotation of said wind turbine in a clockwise direction and permits rotation of said wind turbine in a counterclockwise direction and when said second of said pawls engages said toothed wheel it prevents rotation of said wind turbine in a counterclockwise direction and permits rotation of said wind turbine in a clockwise direction, whereby when said vane rotates to align itself with a new wind vector, said cam rotates with said vane and disengages one of said pawls from said toothed wheel thereby permitting said wind turbine to rotate in the direction of rotation of said vane until said wind turbine is aligned with said vane, at which point said cam permits both said pawls to engage said toothed wheel, locking said wind turbine in aligned position with said wind.

9. A yaw stabilizer device as claimed in claim 8, wherein said wind turbine, said vane and said cam are coaxially mounted to rotate in substantially horizontal planes and said toothed wheel is positioned in a substantially horizontal plane and mounted coaxially with said wind turbine, said vane and said cam, and said cam comprises a substantially disc configuration defined by a substantially open circle closed by a chord of said circle.

* * * * *